United States Patent
Ohnstad

(10) Patent No.: US 12,186,968 B2
(45) Date of Patent: Jan. 7, 2025

(54) SYSTEM, APPARATUS, AND METHOD FOR BENDING A REINFORCING BAR

(71) Applicant: Marshall Composite Technologies, LLC, Salem, OR (US)

(72) Inventor: Thomas S. Ohnstad, Salem, OR (US)

(73) Assignee: Marshall Composite Technologies, LLC, Salem, OR (US)

(*) Notice: Subject to any disclaimer, the term of this patent is extended or adjusted under 35 U.S.C. 154(b) by 0 days.

(21) Appl. No.: 17/898,460

(22) Filed: Aug. 29, 2022

(65) Prior Publication Data

US 2023/0075916 A1  Mar. 9, 2023

Related U.S. Application Data

(60) Provisional application No. 63/238,043, filed on Aug. 27, 2021.

(51) Int. Cl.

| | |
|---|---|
| *B29C 53/02* | (2006.01) |
| *B29C 53/80* | (2006.01) |
| *B29C 53/84* | (2006.01) |
| *B29C 70/50* | (2006.01) |
| *B29C 70/54* | (2006.01) |
| *B29K 309/08* | (2006.01) |

(52) U.S. Cl.
CPC .............. *B29C 53/02* (2013.01); *B29C 53/80* (2013.01); *B29C 53/84* (2013.01); *B29C 70/504* (2013.01); *B29C 70/54* (2013.01); *B29K 2309/08* (2013.01)

(58) Field of Classification Search
CPC ......... B29C 53/02; B29C 53/80; B29C 53/84; B29C 70/504; B29C 70/54; B29K 2309/08; B21D 7/00; B21D 7/02; B21D 7/12; B21D 7/024; B21D 7/04; B21D 7/045; B21D 7/16; B21D 7/162; B21D 43/003; B21D 43/006; B21D 43/105
See application file for complete search history.

(56) References Cited

U.S. PATENT DOCUMENTS

| | | |
|---|---|---|
| 2,870,626 A | 1/1959 | Gillberg |
| 3,494,164 A | 2/1970 | Rehm et al. |
| 5,593,536 A | 1/1997 | Kaiser |
| 5,650,109 A | 7/1997 | Kaiser et al. |
| 5,702,816 A | 12/1997 | Kaiser |
| 5,763,042 A | 6/1998 | Kaiser et al. |

(Continued)

FOREIGN PATENT DOCUMENTS

| | | | |
|---|---|---|---|
| CN | 107335746 A | 11/2017 | |
| DE | 102004002539 A1 * | 8/2005 | ........... B29C 53/083 |

(Continued)

OTHER PUBLICATIONS

WO2015076636A1—Machine Translation (Year: 2015).*

(Continued)

*Primary Examiner* — Yunju Kim
(74) *Attorney, Agent, or Firm* — Kolisch Hartwell, P.C.

(57) ABSTRACT

Systems and methods for bending a composite based reinforcing bar (C-bar), are disclosed, including a bending apparatus, having a bending platform including a plurality of stationary supports, a pair of movable supports, and a control assembly. Each pair of stationary support and corresponding movable support are configured to engage a pair of flanges of the C-bar.

16 Claims, 7 Drawing Sheets

(56) References Cited

U.S. PATENT DOCUMENTS

| | | | |
|---|---|---|---|
| 5,851,468 A | 12/1998 | Kaiser | |
| 5,876,553 A | 3/1999 | Kaiser | |
| 6,221,295 B1 | 4/2001 | Kaiser et al. | |
| 6,316,074 B1 | 11/2001 | Kaiser et al. | |
| 6,326,074 B1 | 12/2001 | Takshashi | |
| 6,485,660 B1 | 11/2002 | Kaiser et al. | |
| 6,493,914 B2 | 12/2002 | Kaiser et al. | |
| 6,596,121 B1 * | 7/2003 | Reynolds, Jr. | B29C 33/505 156/95 |
| 8,591,139 B2 | 11/2013 | Gibson et al. | |
| 9,440,400 B2 | 9/2016 | Gibson et al. | |
| 10,508,390 B2 | 12/2019 | Gibson et al. | |
| 2012/0016511 A1 * | 1/2012 | Yogo | B21D 11/12 901/41 |
| 2019/0085563 A1 | 3/2019 | Bischoff et al. | |
| 2020/0189174 A1 * | 6/2020 | Bischoff | B29C 53/84 |

FOREIGN PATENT DOCUMENTS

| | | | | |
|---|---|---|---|---|
| EP | 0402309 | A1 | 12/1990 | |
| WO | 9600647 | A1 | 1/1996 | |
| WO | 9600824 | A1 | 1/1996 | |
| WO | 9621551 | A1 | 7/1996 | |
| WO | 9815403 | A1 | 4/1998 | |
| WO | WO-2015076636 | A1 * | 5/2015 | B21D 7/024 |

OTHER PUBLICATIONS

DE102004002539—Machine Translation (Year: 2005).*
European Receiving Office of WIPO, International Search Report regarding PCT Patent Application No. PCT/US97/17292, dated Jan. 27, 1998, 3 pages.
U.S. Receiving Office of WIPO, International Search Report regarding PCT Patent Application No. PCT/US22/41943, dated Jan. 31, 2023, 10 pages.
The International Bureau of WIPO, International Preliminary Report on Patentability regarding International Patent Application No. PCT/US2022/041943, dated Mar. 7, 2024, 7 pages.

* cited by examiner

US 12,186,968 B2

SYSTEM, APPARATUS, AND METHOD FOR BENDING A REINFORCING BAR

CROSS-REFERENCES

This application claims the benefit under 35 U.S.C. § 119 (e) of the priority of U.S. Provisional Patent Application Ser. No. 63/238,043, filed Aug. 27, 2021, the entirety of which is hereby incorporated by reference for all purposes. The entirety of U.S. Pat. Nos. 5,702,816; 5,763,042; 5,851,468; 5,650,109; 5,876,553; 5,593,536; 6,485,660; 6,221,295; 6,316,074; and 6,493,914 are hereby incorporated by reference for all purposes.

BACKGROUND

Fiber Reinforced Polymer (FRP) rebar is desirable compared to metal-based counterparts, owing to FRP's long-term stability and corrosion resistance. The past decade has shown a steady increase in the use of FRP rebar in critical infrastructure; the implementation of the use of FRP rebar has proven the need for durable materials in much of North America, and internationally. Currently, however, the FRP rebar industry has limited bend geometries, poor quality, low production rates (because they are primarily individually made in separate tools), inconsistent bend strengths and the inability to bend FRP rebar on-site during construction activities. The industry has needed the ability for consistent, high-quality bends in larger quantities, but, to this point, existing manufacturing methods have been insufficient.

C-bar, which includes a fiber-reinforced core surrounded by a malleable sheath, is particularly desirable for its capacity to be bent after its modified pultrusion process and prior to curing. However, current manufacturing techniques do not provide for high-quality automated bending of C-bar.

Typically, automated metal rebar shaping includes gripping the top and bottom of the rebar with roller wheels. Drive rollers push the rebar into a bending guide that is programmed to bend a certain angle. The process proceeds from one end of the bar to another, and bends are structurally unrelated to adjacent bends.

When applied to C-bar, such bending can result in crushing of the malleable sheath and un-cured core, and undesirable kinks or buckling at bent portions of the C-bar. Sliding movement of the inelastic reinforcing fibers in the resin at the bends, and throughout the length of the rebar section, can cause uneven distribution of the reinforcing fibers. Also, portions of C-bar proximate to the fixture may bend more than those distant from the fixture. New apparatus and methods are needed for high-quality automated bending of C-bar without compromising the fiber-resin constitution of the core.

SUMMARY

The present disclosure provides systems, apparatus, and methods relating to rebar for reinforcing concrete. In some examples, a method of producing rebar may include manufacturing a segment of rebar including an un-cured composite core clad in a shell having first and second flanges extending from opposite sides of the composite core, and placing the segment into a bending apparatus. The method may further include bending the segment to a desired form, and heating the segment sufficiently to cure the composite core of the rebar in the desired form.

In some examples, an automated C-bar bending system may include a plurality of stationary supports and a plurality of freely rotatable and movable supports. Each of the supports may have a circumferential side surface with upper and lower engaging portions. The system may further include at least one mechanical manipulation device connected to the movable supports and a controller directing movement of the mechanical manipulation device, where the at least one mechanical manipulation device is configured to move the movable supports relative to the stationary supports.

In some examples, a method of bending C-bar may include positioning a center line of a segment of C-bar between a pair of stationary supports, and contacting first and second flanges of a shell of the C-bar with engaging portions of the pair of stationary supports. The method may further include positioning a pair of freely rotatable and movable supports on opposite sides of the center line of the segment of C-bar, and contacting engaging portions of the pair of movable supports with the first and second flanges. The method may finally include moving the pair of movable supports symmetrically apart, along the segment of C-bar, using a mechanical manipulation device controlled by a digital processing system, and moving each of the pair of movable supports around a corresponding one of the pair of stationary supports, to induce symmetrical bends in the segment of C-bar.

Features, functions, and advantages may be achieved independently in various examples of the present disclosure, or may be combined in yet other examples, further details of which can be seen with reference to the following description and drawings.

DETAILED DESCRIPTION

Figure 1:
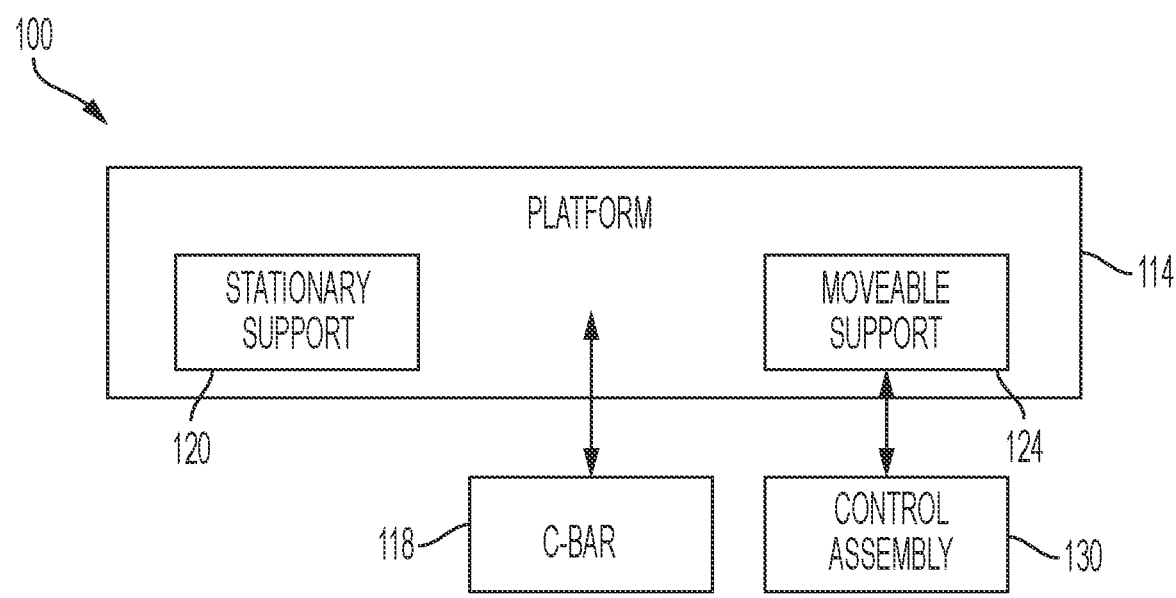
FIG. 1 is a schematic diagram of an illustrative C-bar bending system in accordance with aspects of the present disclosure.

Various aspects and examples of a C-bar bending system and apparatus, as well as related methods, are described below and illustrated in the associated drawings. Unless otherwise specified, a C-bar bending apparatus in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature, and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through E, each of which is labeled accordingly.

Overview

In general, a method for manufacturing C-bar with a desired geometry may include producing a straight C-bar, storing the catalyzed rebar in cold storage for an indefinite amount of time, and, when needed, removing, warming, bending the C-bar with an automated system, and then curing the C-bar in the desired shape. The straight C-bar may be produced in all sizes, and stored for upwards of a year, or longer. The automated bending may be performed with a C-bar bending system such as those as described below. This overall process may allow for bulk storage and off-line automated bend production, which will, in turn, allow for storage of large inventories and on-site bending.

C-bar, as referenced herein, may be understood to be a rebar or similar product including a pultruded core and a removable outer shell of malleable material. For instance, C-bar may comprise a composite core of thermosetting resin with parallel, axial reinforcing fibers, and a two-part aluminum shell. The core may be pultruded without curing, and may be stored appropriately to avoid unwanted curing prior to bending.

A C-bar bending apparatus may include a plurality of fixed engaging structures and a plurality of rotatable engaging structures. Each engaging structure may include a recess between two engaging portions, the recess configured to receive the C-bar without contact, and the engaging portions configured to contact first and second flanges of the C-bar. The engaging structures may be round, and include wheels and/or rollers. At a bend, the C-bar may be gripped between two engaging structures, an engaging structure being on each of the inner and outer sides of the bend.

The fixed engaging structures may be removably or permanently fixed to a support structure such as a table, and the rotatable engaging structures may be controlled by a digital processing system or programmable logic controller via apparatus such as one or more robotic arms or gantry robots. Size and shape of the support structure and/or robotic components may be dictated by C-bar size and desired final geometry. The bending apparatus may be configured to produce a single geometry, to produce a selected set of geometries, and/or may be reconfigurable to produce any desired geometry. The bending apparatus may be configured to produce two-dimensional and/or three-dimensional geometries.

In some examples, the C-bar bending apparatus may include a drive station with a pair of roller wheel sets. Each roller of the roller wheel sets may be configured to engage a respective side of the C-bar flange. Each roller of the roller wheel sets may be mounted on a common shaft and driven by a common drive mechanism, or some or all of the rollers mounted on different shafts and driven by different drive mechanisms. Fine control of the rotational speed of individual rollers may induce a complex curved, for example, twist deformation in the C-bar to produce spiral C-bars.

The bending apparatus may be further configured to facilitate and/or perform steps of a method of producing C-bar. For example, the bending apparatus may rewarm straight stock C-bar previously held in cold storage, before bending. For another example, the bending apparatus may maintain an advantageous temperature of the C-bar throughout bending. For another example, the bending apparatus may facilitate curing of the bent C-bar prior to removal from the apparatus. For instance, the bending apparatus may be compatible with or receivable by a curing apparatus and/or the bending apparatus may include integrated curing functionality.

A method of automated bending of C-bar may include designing an overall bending plan for a desired bend geometry. Unlike steel rebar, bends within a composite rebar section may be related because reinforcing fibers in the core slide across each other under the sheath throughout the full length of the section. Bending may therefore occur from a centerline of a singular bend section, thereby minimizing shift and shear of the fibers. The process may be described as a center-line-to-ends bending process, as opposed to an end-to-end bending process (such as steel rebar bending). The bending design plan may depend on whether a desired bend geometry is symmetrical or asymmetrical.

The method may include gripping the C-bar by flanges of the sheath, and not by the outer cylindrical body of the C-bar. The C-bar may be gripped between a pair of engaging structures configured to contact opposing sides of the sheath flanges or 'ears', which may thereby effectively grip the C-bar without crushing. Deformation of the C-bar and fiber buckling resulting from pinching or other constraints of the reinforcing fibers may also be avoided. One or both of the pair of engaging structures may be driven, and in some examples, the engaging structures may have slightly different input rotational speeds in order to induce a twist in the C-bar.

The method may include moving and/or transporting a C-bar using the bending apparatus and/or using a transport apparatus similarly equipped with pairs of engaging structures.

The method may maximize fiber strength by keeping fibers in tension. That is, during pultrusion fibers are in tension due to the "pulling" of the fiber bundle, and are fixed in position relative to one another in a uniform straight orientation, or "pre-tensioned", when the rebar is cured. Then when the rebar is loaded, the rebar is in tension. The present method of bending C-bar may maintain the desired fiber uniformity. For example, for a symmetrical bend geometry, a C-bar may be positioned against two fixed radius pedestals, with a centerline of the C-bar centered between the pedestals. Two robotically controlled bend drivers may engage the C-bar outside the pedestals, and move simultaneously in opposite directions. This may pull or stress the bar at the centerline, thereby anchoring the central section of the bar and keeping the central section in tension.

In another example, for an asymmetrical bend geometry, an end-section of a C-bar may be positioned against two fixed radius pedestals. Two robotically controlled bend drivers may engage the C-bar outside the pedestals, but a driver closer to the end of the C-bar may be braked while the other driver moves away.

Examples, Components, and Alternatives

The following sections describe selected aspects of exemplary C-bar bending systems as well as related apparatus and/or methods. The examples in these sections are intended for illustration and should not be interpreted as limiting the entire scope of the present disclosure. Each section may include one or more distinct examples, and/or contextual or related information, function, and/or structure.

A. Illustrative C-Bar Bending System

As shown in FIG. 1, this section describes an illustrative bending system 100. Bending system 100 is an example of a C-bar bending apparatus, as described above. FIG. 1 is a schematic diagram of system 100, which includes a bending platform 114 configured to receive a C-bar 118, and a control assembly 130 for controlling operations of the bending process. A bending apparatus may be positioned downstream in line with a rebar manufacturing apparatus, or may be used remotely, for example, at a construction site. Uncured and/or partially cured rebar may be maintained in storage and/or transport at a temperature selected to delay final curing until the rebar is suitably bent into a desired shape.

Bending platform 114 also includes one or more radius pedestals or stationary supports 120. The supports may be permanently fixed to platform 114 in a predefined arrangement configured for bending C-bar 118 to a desired shape. Optionally, stationary supports 120 may be removably fixed to platform 114 to allow for changing positions of the stationary supports with respect to each other to achieve various bending geometries or shapes.

Bending platform 114 is further configured to receive one or more bend drivers or movable supports 124 controlled by control assembly 130. Moveable supports 124 may be allowed to move along a predefined direction or held at a predefined position by controlling operations of control assembly 130. In some examples, the control assembly may include a programmed series of movements for moveable supports 124, to achieve a desired bend geometry.

Stationary supports 120 may be described as passive, while movable supports may be described as active, in bending of C-bar. That is the movable supports may actively bend the C-bar around the stationary supports, while the stationary supports passively resist. The stationary support or pedestal 120 may include curved structures with variable curvature. The degree of curvature of the stationary support 120 determining the degree of bend in the C-bar.

B. Illustrative C-bar Bending System

Figure 2:
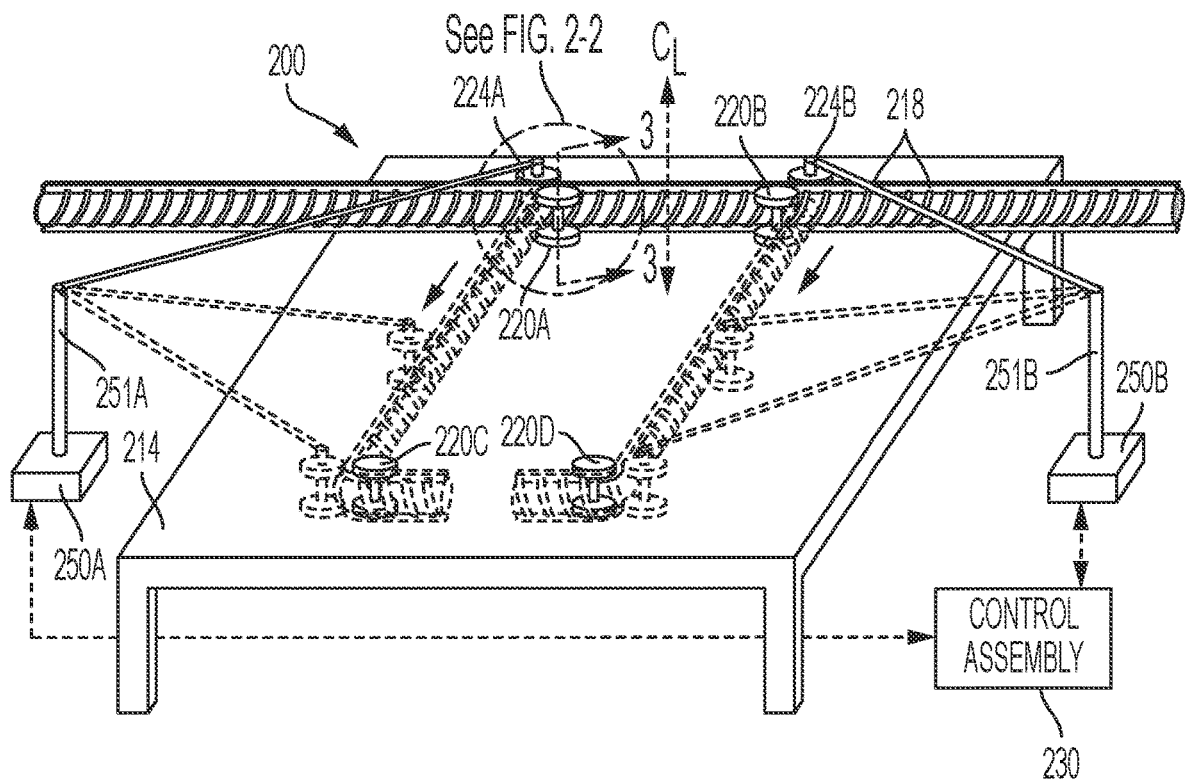
FIG. 2 is a perspective view of another illustrative C-bar bending system.
Figure 3:
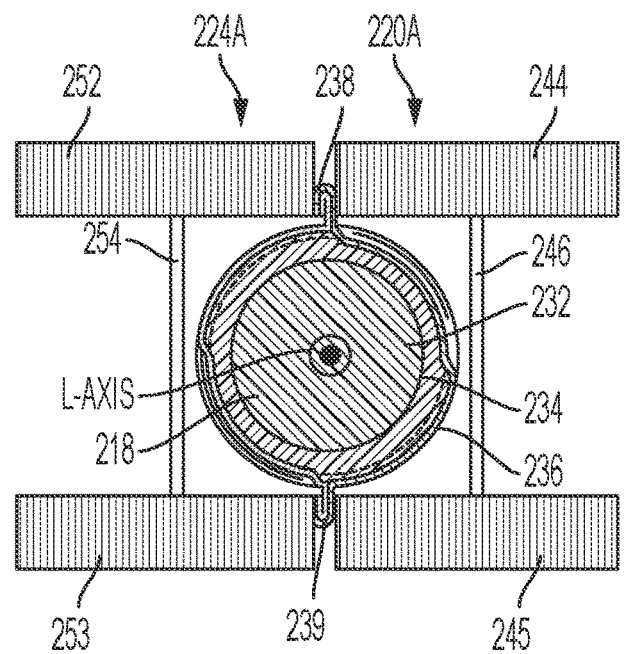
FIG. 3 is a cross-sectional view of FIG. 2 along line 3-3, showing bend drivers and pedestals engaging upper and lower flanges of shells enveloping the C-bar of FIG. 1.
Figure 4:
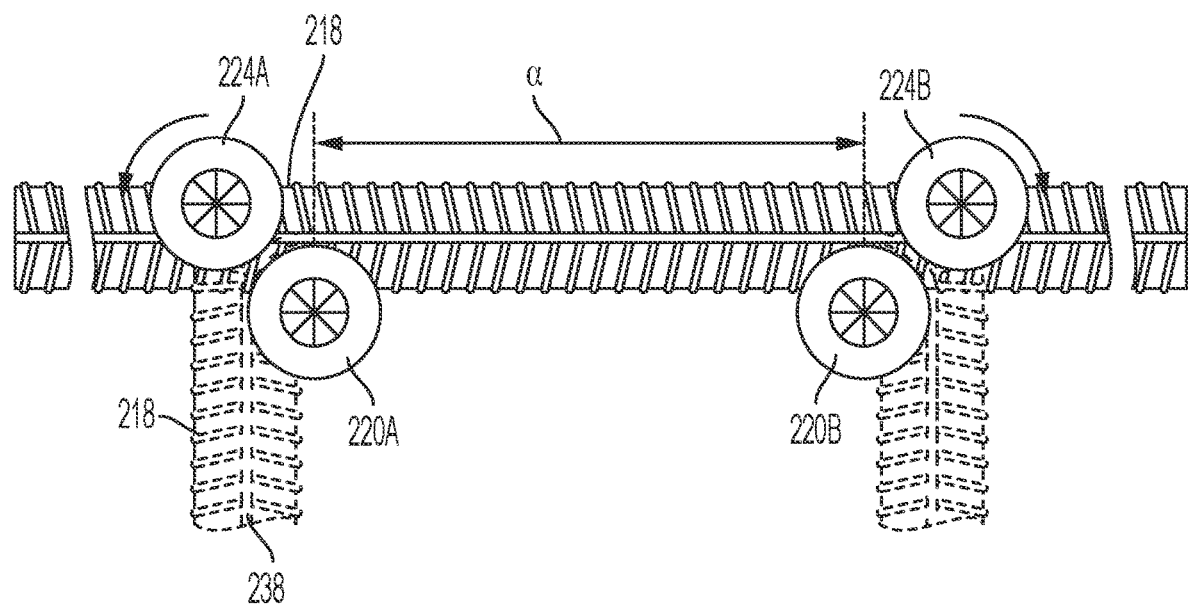
FIG. 4 is a top view of portion of FIG. 2 showing bend drivers and pedestals engaging upper flanges of shells enveloping the C-bar.

As shown in FIGS. 2-4, this section describes another illustrative bending system 200. Bending system 200 is also an example of a C-bar bending apparatus, as described above. FIG. 2 is a schematic diagram of system 200, which is configured to bend a C-bar according to a predefined bend design plan. Many of the components and features of system 200 are similar to those of system 100, and have therefore been numbered correspondingly.

Bending system 200 includes a bending platform 214, which is configured to receive a length of straight C-bar 218. As shown in FIG. 3, C-bar 218 in a precured state may include a core 232 of reinforcing fibers impregnated with a resin, a cladding 234 of reinforcing fibers and other reinforcing material (such as ceramic powder or spheres) impregnated with a resin, and an outer shell 236, typically formed of a material that is sufficiently ductile to be formed into a desired shape, yet sufficiently rigid to retain its shape once it is formed (such as aluminum or steel). Examples of C-bar are described in U.S. Pat. Nos. 6,485,660; 6,221,295; 6,493,914; and 6,316,074 mentioned above. Core 232 and cladding 234 can be formed by a pultrusion-type technique, but unlike in conventional pultrusion techniques the resins of core 232 and cladding 234 are not cured. The core and cladding are encased in two pieces of shell material 236, the edges of which are folded over to form a pair of flanges 238, 239 extending orthogonal to a longitudinal axis L of C-bar 218.

Shell structure 236 may hermetically seal the uncured C-bar to allow for durable cold storage and ease of transportation. Concurrently, the shell structure may allow for uninterrupted heat transfer, thereby facilitating uniform curing. In some examples, C-bar 218 may be conveyed to bending system 200 by a conveyor in line with a C-bar manufacturing assembly. Alternatively, the C-bar may be manufactured remotely, stored and/or transported in cold storage, and later retrieved from the cold storage to manually place on bending platform 114.

In the example shown in FIG. 2, bending platform 214 includes four stationary supports or radius pedestals 220. The four radius pedestals include first, second, third, and fourth pedestals 220A-D arranged in a rectangular geometry. In the depicted example, bending platform 214 is configured for a standard rectangular open rebar shape. In general, the platform may be configured for any desired shape, including but not limited to other standard open or closed rebar bends.

Figure 2A:
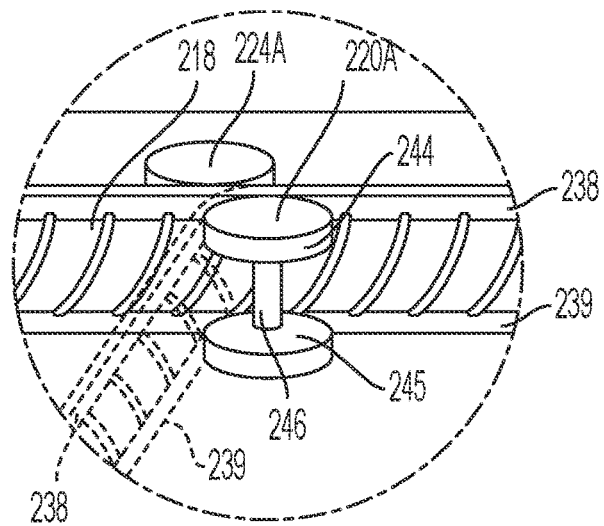
FIG. 2A is an enlarged view of a portion of FIG. 2.

Each of pedestals 220A-D may be fixed to platform 214 or may be removably attached to allow for rearrangement of the pedestals to achieve different bending configurations. In particular, as shown in FIG. 2A, first pedestal 220A includes a dumbbell shaped unit or a pair of disc-shaped structures 244, 245 connected by a central shaft 246. Disc structures 244, 245 may be stationary, and non-rotatable. Second through fourth pedestals 220B-D may also be understood to have a similar shape and structure.

Figure 2B:
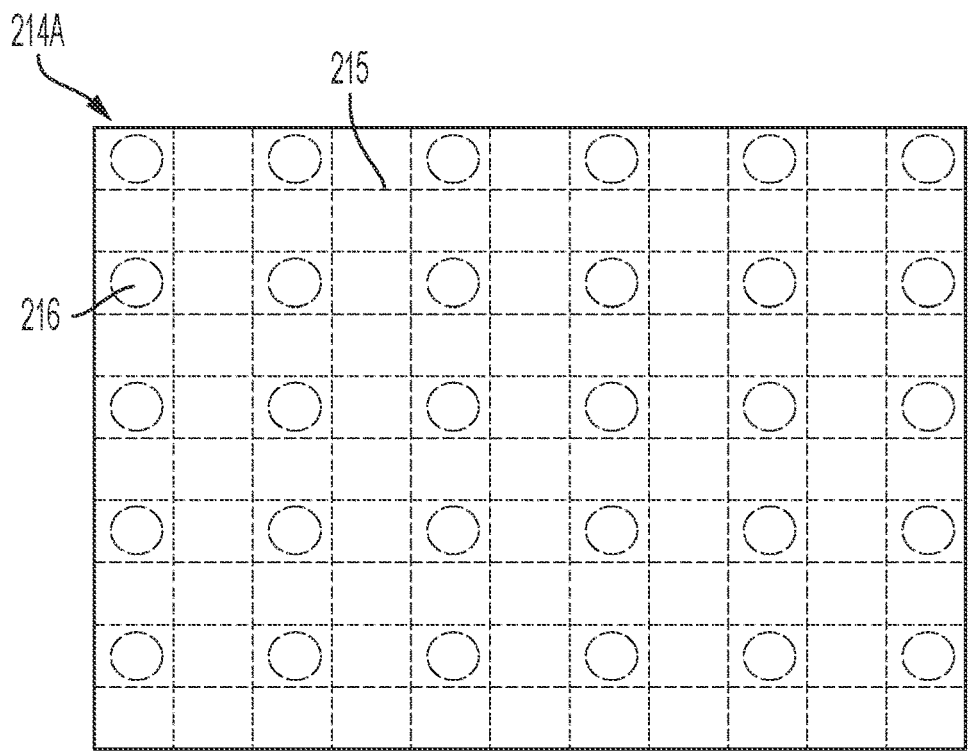
FIG. 2B is a top view of a re-configurable bending platform.

In some examples, bending platform 214 may be a re-configurable bending platform 214A as illustrated in FIG. 2B. Platform 214A includes a grid structure 215 having a plurality of apertures 216 for removably receiving pedestals to achieve various bending configurations for C-bars. The pedestals may be received in apertures 216 and secured by magnetic, adhesive, threaded screw connections, or any suitable stable connection mechanism. C-bars with various diameters and sizes may be easily accommodated for bending on platform 214A by moving the pedestals to different apertures 216 accordingly.

Methods of bending C-bar, such as method 400 described further below, may be performed using bending platform 214. In such cases, the methods may further include selectively mounting the pedestals in different apertures, for bending a segment of C-bar to a desired form. As described further with reference to FIGS. 6A-6N below, selective positioning of the pedestals in the appropriate apertures 216 may facilitate bending of C-bar to a wide variety of desired geometries.

As shown in FIG. 2, bending system 200 further includes a pair of movable supports, idler wheels or bend drivers 224A, 224B configured to move around radius pedestals 220A-D. The movement of each bend driver 224A, 224B is controlled and facilitated by a corresponding robotic unit 250A, 250B having a respective articulated arm 251A, 251B. Further, each robotic unit may be connected to a centralized control assembly 230.

In some examples, movement of bend drivers 224A, 224B may be controlled by other mechanical manipulation devices, such as belts, chains, or gears. Control assembly 230 may be manually operated by a user of the bending system, may include autonomous components such as a programmable logic controller, may be in communication with a digital processing system such as a computer or server, and/or may be a digital processing system including a memory having stored instructions for movement of the bend drivers.

As shown more clearly in FIGS. 2A and 3, bend driver 224A includes a dumbbell-shaped wheel structure. In other words, similar to pedestals 220 A-D, bend drivers 224A, 224B each include a pair of disc-shaped rollers 252, 253 connected by a common central shaft 254. Rollers 252, 253 may be described as idling or idler wheels, and may be un-driven and freely rotatable. Central shaft 254 may be connected to the articulated arm of the corresponding robotic unit.

In comparison to disc structures 244, 245 of pedestals 220A-D, rollers 252, 253 of bend drivers 244A, 244B may have the same shape and dimensions, but different motion. That is, disc structures 244, 245 may be fixed, while rollers 252, 253 may be freely rotatable. In some examples, radius pedestals 220 and/or bend drivers 224 may be unitary structures, including upper and lower engaging portions.

As shown in FIG. 2, an appropriate length of C-bar 218 is fed to platform 214, such that flanges 238, 239 are oriented orthogonal to the platform. The flanges of the C-bar may be described as extending vertically, or up-and-down. A centerline CL of C-bar 218 is indexed with a reference mark on the platform, at a center point between first and second pedestals 220A, 220B. That is, the C-bar is positioned with the centerline at the reference mark on the platform.

As shown in FIGS. 3 and 4, first bend driver 224A is configured to engage upper and lower flanges 238, 239 of C-bar 218 against first pedestal 220A. Similarly, second bend driver 224B is configured to engage upper and lower flanges 238, 239 of C-bar 218 against second pedestal 220B via robotic units 250B. The flanges are gripped between the disc-shaped structures of the pedestals and the rollers of the bend drivers, but the C-bar is contacted only at the flanges. The dumbbell or recessed shapes of the pedestals and bend drivers are configured to facilitate this engagement, and thereby avoid damage to the core and cladding or interference with the fibers during bending.

Referring again to FIG. 2, Robotic unit 250A may move first bend driver 224A around third pedestal 220C, resulting in an L-shaped, 90 degree, or right-angle bend of C-bar 218 at point between first bend driver 224A, and first pedestal 220A. Similarly, robotic unit 250B may move second bend driver 224B around fourth pedestal 220D, resulting in a matching right-angle bend of C-bar 218 at point of contact between second bend driver 224B, and second pedestal 220B. In other words, robotic units 250A, 250B move first and second bend drivers 224A, 224B simultaneously in opposite directions, thus pulling or stressing C-bar 218 at centerline CL.

Upon reaching proximity with third and fourth pedestals 220C, 220D, control assembly 230 is configured to apply brakes to first and second bend drivers 224A, 224B via robotic units 250A, 250B, respectively. Application of a braking force may result in anchoring a straight section or alpha section a of C-bar 218 (see FIG. 4) for maintaining an appropriate tension to minimize migration of fibers in resin. Furthermore, robotic units 250A, 250B may move first bend driver 224A around fourth pedestal 220D, and second bend driver 224B around third pedestal 220C to create two further right-angle bends. At this point the bend drivers 224A, 224B may move inward toward each other, to assure the "tails" of the C-bar 218 are aligned toward each other.

It is preferable that each of the above-mentioned bends be performed at an optimal temperature for bending of C-bar 218. Bending apparatus 210 may include a heater and/or temperature sensors for achieving and maintaining such optimal temperatures. Additionally, an inductive curing device may be included downstream in bend system 200, to achieve and maintain optimal curing temperatures immediately after bending occurs. Such curing devices may allow for targeted curing of C-bar 218 for stiffening while maintaining a desired bend angle, thereby reducing migration of fibers.

C. Illustrative C-bar Bending System

Figure 5:
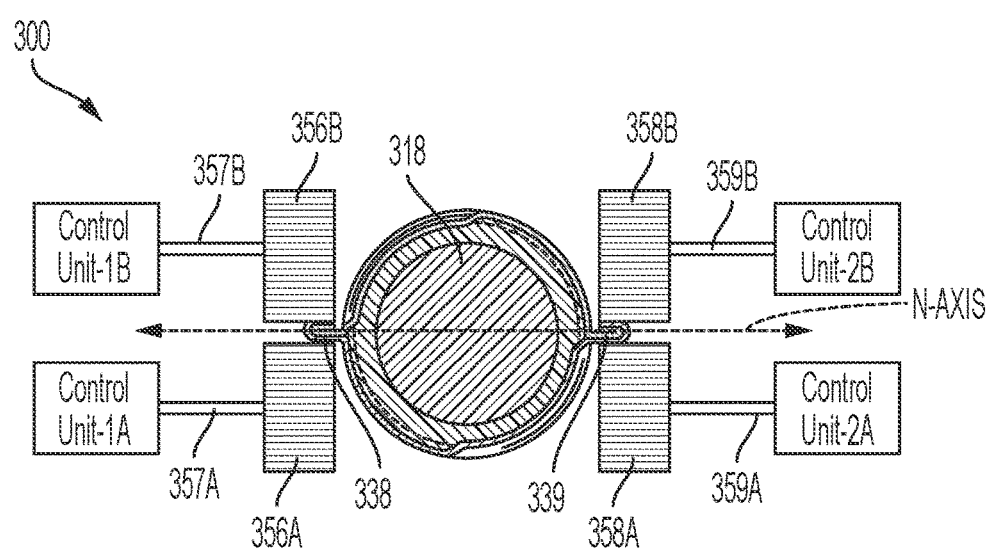
FIG. 5 is a side cross-sectional view of an alternative embodiment for bending a C-bar.

As shown in FIG. 5, this section describes another illustrative bending system 300. Bending system 300 is also an example of a C-bar bending apparatus, as described above. FIG. 5 is a schematic diagram of system 300. Flanges 338, 339 of a C-Bar 318 are aligned along a neutral axis N, respectively. While rollers 356A, 356B of a first wheelset grip opposite sides of flange 338, rollers 358A, 358B of a second wheelset grip opposite sides of flange 339, thereby minimizing any damage to C-bar 318. Optionally, each roller of the wheelsets may have a peripheral traction surface configured to engage the respective flange for better grip.

Rollers 356A, 356B are operationally connected to control units 1A, 1B via respective drive shafts 357A, 357B. Similarly, rollers 358A, 358B are operationally connected to control units 2A, 2B via respective drive shafts 359A, 359B. Rollers 356A, 356B may be driven in sync by a first drive mechanism, while rollers 358A, 358 may be driven in sync by a second drive mechanism. In some examples, the first and second drive mechanisms may be operated at matching speeds to transport C-bar 318. In some examples, the first and second drive mechanisms may be operated at different speeds to induce a desired twist or bend in C-bar 318. Alternatively, speeds of roller 356A, 356B, 358A, 358B, may be individually controlled via respective control units 1A-1B, 2A-2B, to induce more complex bending such as twists. Such twisting may be used in forming three-dimensional bend geometries such as coils.

In some other examples, similar to bending system 200, rollers 356A, 356B of a first wheelset may be maintained stationary, while individual speeds of rollers 358A, 358B of a second wheelset may be controlled by control units 2A/2B to induce desired bending or twists in the plane of the N-axis or orthogonal to the plane of the N-axis. In this case, rollers 356A, 356B of a first wheelset may be configured for smooth passage of the flange 338A between them, while rollers 358A, 358B of a second wheelset grip may include traction to engage flange 338B for better grip. Alternatively, individual speeds of rollers 356A, 356B of a first wheelset may be controlled by control units 1A/1B, while maintaining rollers 358A, 358B of a second wheelset stationary to induce desired bending or twists in the plane of the N-axis or orthogonal to the plane of the N-axis.

D. Illustrative C-Bar Bend Geometries

Figure 6A:
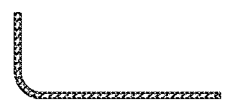
FIGS. 6A-6N are schematic cross-sectional views of examples of bending geometries achievable by the C-bar bending system.
Figure 6B:
Figure 6C:
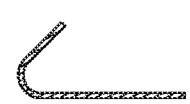
Figure 6D:
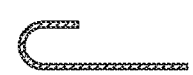
Figure 6E:
Figure 6F:
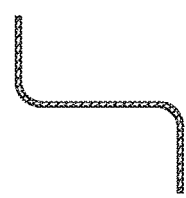
Figure 6G:
Figure 6H:
Figure 6I:
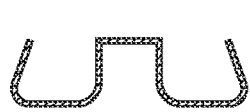
Figure 6J:
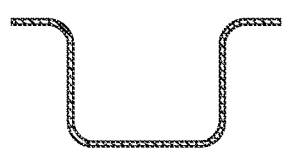
Figure 6K:
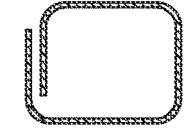
Figure 6L:
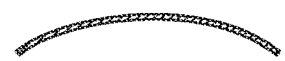
Figure 6M:
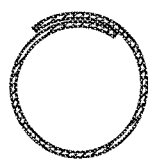
Figure 6N:
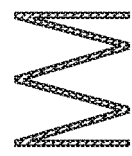

A single unitary piece of C-bar may be bent into various configurations having different bend geometries by employing the above-described bending systems 200 and/or 300. Each of FIGS. 6A-6N illustrates a configuration achievable by a single unitary piece of C-bar. For example, FIG. 6A illustrates a right-angled bent configuration, FIG. 6B illustrates an obtuse-angled bent configuration, FIG. 6C illustrates an acute-angled bent configuration, FIG. 6D illustrates a hook configuration, FIG. 6E illustrates a W-shaped configuration, FIG. 6F illustrates a Z-shaped configuration, FIG. 6G illustrates a U or C configuration, FIG. 6H illustrates an open-U configuration, FIG. 6I illustrates a rounded-W configuration, FIG. 6J illustrates a gull-wing configuration, FIG. 6K illustrates a closed stir-up configuration, FIG. 6L illustrates a closed large radius curve configuration, FIG. 6M illustrates a closed hoop configuration, and FIG. 6K illustrates a spiral configuration.

E. Illustrative Method for Bending C-Bar

Figure 7:
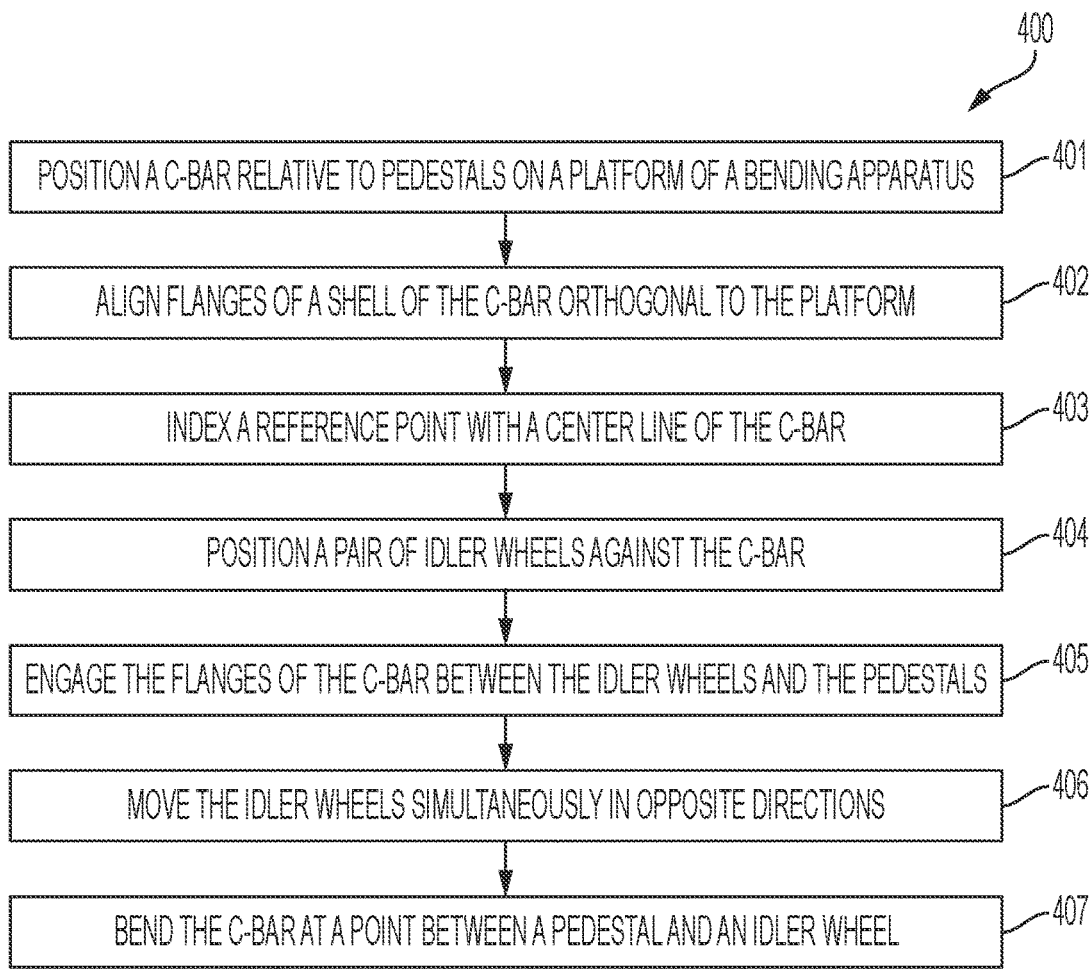
FIG. 7 is a flow chart depicting steps of an illustrative method for bending a C-bar according to the present teachings.

This section describes steps of an illustrative method 400 for bending a C-bar using a C-bar bending apparatus; see FIG. 7. Aspects of the bending systems, platforms, supports, and/or control assemblies described above may be utilized in the method steps described below. Where appropriate, reference may be made to components and systems that may be used in carrying out each step. These references are for illustration, and are not intended to limit the possible ways of carrying out any particular step of the method.

FIG. 7 is a flowchart illustrating steps performed in an illustrative method, and may not recite the complete process or all steps of the method. Although various steps of method 400 are described below and depicted in FIG. 7, the steps need not necessarily all be performed, and in some cases, may be performed simultaneously or in a different order than the order shown.

At step 401, method 400 includes conveying a segment of C-Bar with an un-cured composite core encased in a shell structure to the bending system or apparatus. The step may further include placing the segment of C-bar in the bending apparatus, and appropriately positioning the C-bar. The C-bar may be positioned relative to one or more stationary supports or pedestals on a platform of the apparatus. Positioning of the C-bar may be performed according to a pre-determined bending plan, and may depend on the symmetry of a desired bend geometry.

Next, at step 402, method 400 further includes aligning the C-bar such that flanges of the shell structure are oriented orthogonal to the platform. Such alignment of the C-bar may also be described as orienting a neutral axis of the C-bar. The flanges may be aligned with rollers, disc-shaped engaging portions, or other gripping structures of the pedestals on the platform.

At step 403, for symmetrical geometries method 400 further includes indexing a center line of the C-bar with a reference point on the platform between two pedestals. For asymmetrical geometries, another relevant position on the C-bar may be similarly indexed.

Next, at step 404, method 400 further includes positioning at least a pair of bend drivers against the C-bar. Each bend driver may be a freely rotatable structure configured to contact the flanges of the C-bar. In some examples, the bend driver may be part of an assembly, including a brake. Each bend driver may be moveable relative to the platform, by a control mechanism or assembly such as a robotic arm.

At step 405, method 400 further includes positioning the bend drivers on an opposing side of the C-bar from the pedestals, such that the flanges are effectively engaged or gripped between the bend drivers and the pedestals. Step 405 may be described as engaging the flanges of the shell structure of the C-bar with the relevant structures of the bending apparatus. For example, in bending system 200 the flanges of the shell structure may contact the disc shaped structures of the fixed pedestals and the rollers of the bend drivers. That is, step 405 may include applying a first roller to a first flange of the C-bar, and applying a second roller to a second, opposing flange of the C-bar.

At step 406, method 400 further includes moving the bend drivers along the C-bar simultaneously in opposing directions. The C-bar may be anchored against the pedestals, and placed in tension between the bend drivers. The segment of C-bar may be described as having a middle portion between first and second end portions, and at step 406 the bend drivers may move out from the middle portion to the first and second end portions.

Step 407 includes moving the bend driver around the pedestal through a selected degree range to bend the C-bar to a desired angle. For symmetrical bend geometries, the two bend drivers may bend the C-bar simultaneously. In other examples, one bend driver may apply a brake to anchor the C-bar while the other wheel performs a bend. The steps of moving the bend drivers and bending the C-bar may be repeated as needed to obtain desired bends. The bend drivers may be moved according to the predetermined bending plan, and based on the locations of the pedestals. Step 407 may also be described as bending the C-bar and/or actively bending the segment of C-bar around the curved structure of a pedestal.

Method 400 may be fully or partially automated. For example, the C-bar may be manually positioned on the platform of the bending apparatus, or may be automatically fed from a manufacturing process. Movement of the bend drivers may be controlled by a digital processing system, according to stored digital instructions.

The method may be performed at a manufacturing location such as a factory, or may be performed on-site such as at a building site. For example, C-bar may be bent in large quantities to be stocked and/or according to submitted work orders. For another example, C-bar may be bent as needed, on-demand at a work site. In the latter example, the bending apparatus used may be configured for portability.

Figure 9:
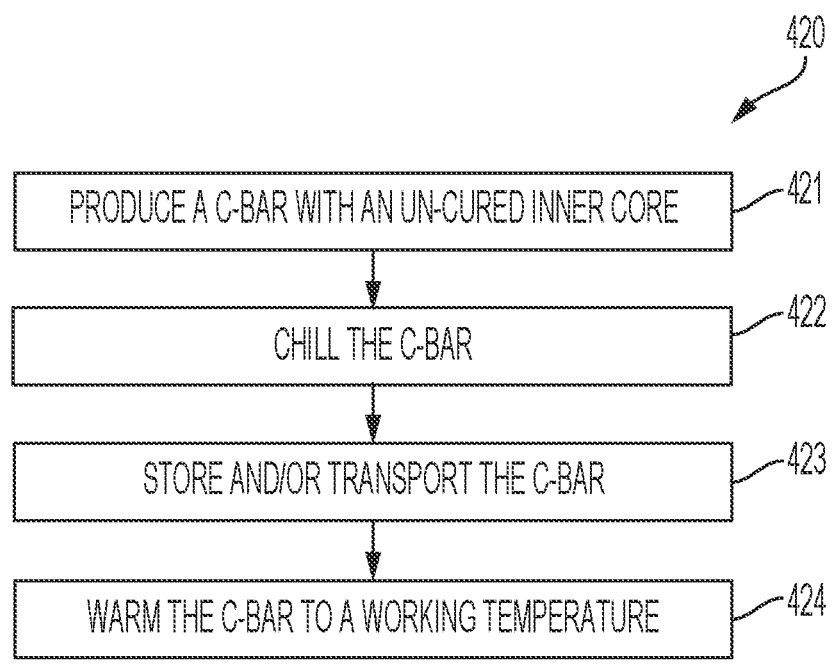
FIG. 9 is a flow chart depicting preparation steps for the method of FIG. 6.

Method 400 may be performed immediately after manufacture of the C-bar, or after removal of the C-bar from cold storage. In some examples, method 400 may include a preparation process 420 prior to first step 401. A length or segment of C-bar may be prepared for bending according to process 420. FIG. 9 is a flowchart illustrating process 420. As described above, the C-bar may include a fiber reinforced composite core material surrounded by a malleable shell material.

Step 421 includes producing a C-bar or segment of C-bar with an un-cured composite core. The step may include pultruding an inner core of the segment of C-bar, and/or pultrusion of a cladding surrounding the core. The core may comprise reinforcing fibers impregnated with a resin, while the cladding may further comprise additional reinforcing material. Unlike conventional pultrusion techniques, the resins of the core and cladding may not be cured in the pultrusion process. Step 421 may further include surrounding the core with an outer shell of a ductile but rigid material such as aluminum or steel.

In some examples, method 400 may proceed directly after step 421 with bending, beginning at step 401. That is, a segment of C-bar may be bent immediately after production. The C-bar may be stored for a limited time at room temperature before proceeding either with step 401 or step 422. Preferably, not more than 3 days may elapse between step 421 and either step 401 or step 422. At most, not more than one week may elapse before proceeding with the method. Storage for greater periods of time, or at higher temperatures may result in undesirable curing of the C-bar.

Step 422 includes chilling the C-bar. The C-bar may be cooled sufficiently to prevent or slow additional curing of the core material. In some examples, an appropriate temperature may be selected according to additional factors, such as expected duration of storage For example, where the core includes glass fiber and vinyl ester resin the C-bar may be cooled to a temperature of −17 degrees Celsius (0 degrees Fahrenheit) or colder. The bar may be stored in such conditions for at least one year.

At step 423, the process includes storing and/or transporting the C-bar. The C-bar may be held at the cooled temperature throughout storage and/or transportation to prevent unwanted curing of the core material. In some examples, the C-bar may be stored for an extended period at a colder temperature, and transported for a brief period at a warmer temperature. For instance, the C-bar may be stored for multiple months below −17 degrees Celsius (0 degrees Fahrenheit), and may then be transported at room temperature for 24 hours.

Step 424 includes warming the C-bar to a working temperature, or to within a working temperature range. The C-bar may be warmed to the working temperature by exposure to ambient air temperature, by use of a warming oven, by inductive heating of the shell, or by any effective means. Appropriate warming techniques may be determined according to the working temperature and the location in which bending is to be performed. For example, ambient warming may require more time than active heating, but may be more feasible when bending is performed at a building site.

The working temperature or temperature range may selected according to the material of the C-bar core, a degree of preliminary curing undergone in storage or transportation, a desired bend geometry, and/or any other appropriate factors. At the working temperature, the C-bar may be sufficiently malleable to permit effective bending with an apparatus such as bending system 100, 200, or 300 as described above. At the working temperature the C-bar may have an uncured or substantially uncured resin matrix. For example, a C-bar may have a working temperature of room temperature (approximately 24 degrees Celsius or 75 degrees Fahrenheit) or a working temperature range of 24-38 degrees Celsius (50-100 degrees Fahrenheit).

Figure 8:
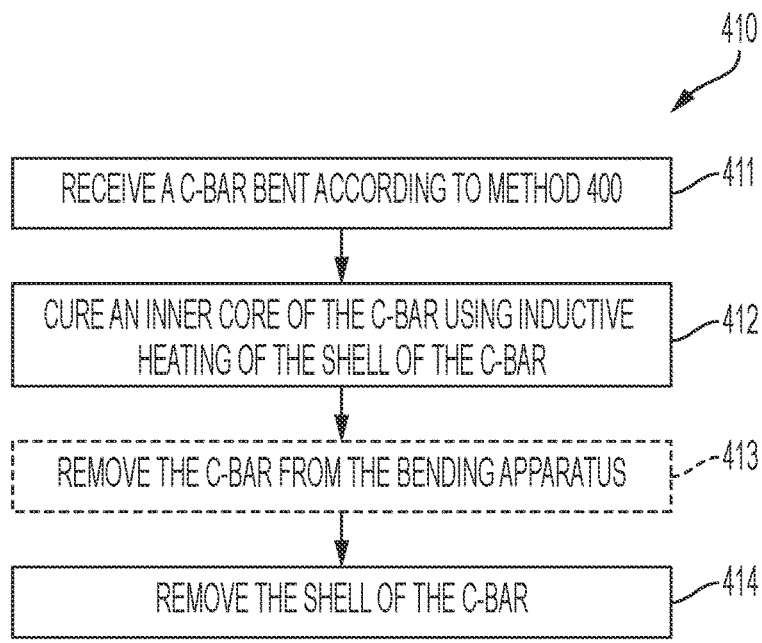
FIG. 8 is a flow chart depicting optional finishing steps for the method of FIG. 6

FIG. 8 is a flowchart illustrating an optional additional finishing process 410 which may be included in method 400. At step 411, finishing process 410 includes receiving a C-bar bent according to the steps of method 400, either still in place in the bending apparatus, or after removal. At step 412, process 410 next includes curing the inner core of the C-bar, using inductive heating of the shell structure of the C-bar. Step 412 may also be described as heating the C-bar sufficiently to rigidify the desired form of the rebar.

In some examples, the curing may be performed using a heating system of the bending apparatus. In such examples, at step 413, process 410 may further include removing the cured C-bar from the bending apparatus. In some examples, curing may be performed according to other techniques known to those skilled in the art. Curing may include heating the core and/or shell of the C-bar, and/or any process appropriate to rigidify the composite material or otherwise set a resin or epoxy component of the composite material.

In examples where the C-bar core includes glass fiber and vinyl ester resin with catalyst systems, the core may be heated to a temperature of at least 105 degrees Celsius (220 degrees Fahrenheit) for at least 30 minutes, but not more than 135 degrees Celsius (275 degrees Fahrenheit) and/or for no more than one hour. The C-bar may be cured sufficiently to have full resin polymerization, but not to the degree that the resin is over cured and weakened.

Finally, at step 414, process 410 includes removing the shell from the C-bar to yield a cured C-bar with a desired plurality of bends. As with method 400 and process 420, steps of process 410 may be performed in a manufacturing facility and/or at a location where the bent C-bar will be used.

Illustrative Combinations and Additional Examples

This section describes additional aspects and features of apparatus and methods for C-bar bending systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the cross-References, in any suitable manner. Some of the paragraphs below expressly refer to and further limit other paragraphs, providing without limitation examples of some of the suitable combinations.

A0. A composite rebar bending apparatus, comprising:
   a first drive station including at least a first roller and a second roller, the first roller configured to contact a first flange on a first side of a piece of rebar, the second roller configured to contact a second flange on a second side of the rebar opposite from the first side of the rebar.

A1. The apparatus of A0, wherein the first and second rollers are mounted on a common shaft.

A2. The apparatus of paragraph A0 or A1, wherein the first and second rollers are driven by the same drive mechanism.

A3. The apparatus of any of paragraphs A0-A2, wherein the first and second rollers are mounted on different shafts.

A4. The apparatus of any of paragraphs A0-A3, wherein the first and second rollers are driven by separate drive mechanisms.

A5. The apparatus of any of paragraphs A0-A4, further comprising: third and fourth rollers, the first and third rollers contacting opposite sides of the first flange, and the second and fourth rollers contacting opposite sides of the second flange.

A6. The apparatus of paragraph A3, wherein the first and second rollers are operable at different rotational speeds.

A7. The apparatus of any of paragraphs A0-A6, wherein each roller has a peripheral traction surface configured to grip a flange.

A8. The apparatus of any of paragraphs A0-A7, further comprising: a second drive station, the first and second drive stations being configured to bend the rebar around multiple axes.

A9. The apparatus of paragraph A8, the first and second drive stations being configured to twist the rebar into a complex-curved shape.

A10. The apparatus of any of paragraphs A0-A9, further comprising: a temperature control unit for controlling the temperature of the rebar during a bending procedure.

A11. The apparatus of paragraph A10, wherein the temperature control unit is configured to maintain the rebar at a first temperature that allows optimal shifting of adjacent fiber positions inside the rebar during a bending procedure.

A12. The apparatus of paragraph A11, wherein the temperature control unity is configured to alter the temperature of the rebar to a second temperature that is optimal for curing the rebar shape after a bending procedure.

B0. A system for bending a composite based reinforcing bar (C-bar), comprising:
 a bending apparatus, comprising:
  a bending platform including a plurality of stationary support and a pair of movable supports; and
  a control assembly.

B1. The system of paragraph B0, wherein each movable support is configured to move via a robotic unit controlled by the control assembly.

B2. The system of paragraph B0 or B1, wherein a first movable support is controlled by a first robotic unit, and a second movable support is controlled by a second movable support.

B3. The system of any of paragraphs B0-B2, wherein the C-bar includes a core enveloped by a cladding layer in turn enveloped in a shell structure.

B4. The system of any of paragraphs B0-B3, wherein edges of the shell structure are folded inwardly to form a pair of flanges extending in opposing directions, and orthogonal to a longitudinal axis of the C-bar.

B5. The system of paragraph B4, wherein the C-bar is fed with the flanges oriented orthogonal to the bending platform.

B6. The system of paragraph B5, wherein the stationary support, and movable support are configured to engage the pair of flanges.

B7. The system of paragraph B5 or B6, wherein a movement of movable support while engaging the pair of flanges against the stationary support results in bending of C-bar.

C0. A method for bending a composite based reinforcing bar (C-bar), comprising:
 conveying a C-Bar enveloped in a shell structure to a C-bar bending apparatus;
 positioning the C-bar relative to a first, and a second pedestal on a platform of the C-bar bending apparatus;
 aligning the C-bar such that flanges of the shell structure are extending orthogonal to the platform;
 indexing a reference point corresponding to a center line of the C-bar;
 positioning a first driver assembly proximate to the first pedestal, and a second driver assembly proximate to the second pedestal;
 engaging the flanges of the C-bar by first and second driver assemblies with first, and second pedestal respectively;
 moving the first and second driver assembly simultaneously in opposite directions; and
 moving the first driver assembly towards third pedestal, and second driver assembly towards fourth pedestal, and bending C-bar at a point of contact between the first pedestal/first driver assembly, and second pedestal/second driver assembly.

C1. The method of paragraph C0, further comprising:
 moving the first driver assembly towards fourth pedestal, and second driver assembly towards third pedestal, and bending C-bar at a point of contact between third pedestal/first driver assembly, and fourth pedestal/second driver assembly.

C2. The method of paragraph C1, further comprising:
 subjecting the C-bar to inductive curing to cure an inner core including resin and fiber material.

C3. The method of paragraph C2, further comprising:
 removing the shell structure from the C-bar to yield a cured C-bar including desired bends.

C4. The method of paragraph C2 or C3, further comprising
 checking a temperature of the C-bar prior to bending the C-bar at the point of contact between the first pedestal/first driver assembly, and second pedestal/second driver assembly.

D0. An automated composite rebar (C-bar) bending system, comprising:
 a plurality of stationary supports, each having a circumferential side surface with upper and lower engaging portions,
 a plurality of freely rotatable and movable supports, each having a circumferential side surface with upper and lower engaging portions,
 at least one mechanical manipulation device connected to the movable supports and configured to move the movable supports relative to the stationary supports, and
 a controller directing movement of the mechanical manipulation device.

D1. The system of paragraph D0, wherein the system is configured to receive a C-bar between the circumferential side surface of a stationary support of the plurality of stationary supports and the circumferential side surface of a movable supports of the plurality of movable supports, such that the upper and lower engaging portions of the side surfaces contact upper and lower flanges of the C-bar.

D2. The system of paragraph D0 or D1, wherein the mechanical manipulation device includes at least one robotic arm.

D3. The system of any of paragraphs D0-D2, further including a platform on which the plurality of stationary supports are secured in a pattern corresponding to a desired bend geometry.

D4. The system of paragraph D3, wherein the platform and the plurality of stationary supports are reconfigurable between multiple patterns.

D5. The system of any of paragraphs D0-D4, wherein the system is portable.

D6. The system of any of paragraphs D0-D5, wherein the controller is a digital processing system including a memory having stored instructions for movement of the movable supports corresponding to a pattern of the plurality of stationary supports and a desired bend geometry.

D7. The system of any of paragraphs D0-D6, wherein one or more of the movable supports includes a brake actuated by the controller.

D8. The system of any of paragraphs D0-D7, wherein the upper and lower engaging portions of each movable support are upper and lower rollers, which rotate around a common shaft.

D9. The system of any of paragraphs D0-D8, further including an inductive heating system configured to cure a composite core of the C-bar by heating a metal shell of the C-bar.

E0. A method of bending composite rebar (C-bar), comprising:
 positioning a center line of a segment of C-bar between a pair of stationary supports,
 contacting a first side of first and second flanges of a shell of the segment of C-bar with engaging portions of the pair of stationary supports, positioning a pair of freely rotatable and movable supports on opposite sides of the center line of the length of C-bar, contacting engaging portions of the pair of movable supports with a second side of the first and second flanges, moving the pair of movable supports symmetrically apart, along the segment of C-bar, using a mechanical manipulation device controlled by a digital processing system, and moving each of the pair of movable supports around a corresponding one of the pair of stationary supports, to induce symmetrical bends in the segment of C-bar F0. A method of bending C-bar, comprising:

gripping opposing seams of a shell of a C-bar member between a round static structure and a round rotatable structure, moving the rotatable structure around the static structure with a mechanical manipulation device controlled by a digital processing system, inducing a bend in the C-bar member while maintaining tension in reinforcing fibers of a core of the C-bar member without causing buckling.

F1. The method of paragraph F0, further including:

receiving the C-bar member from cold storage, and heating the C-bar member to a working temperature.

G0. A method of transporting C-bar, comprising:

contacting a first side of opposing seams of a shell of the C-bar member with engaging portions of a first driver wheel assembly, contacting a second side of the opposing seams with engaging portions of a second driver wheel assembly, gripping the C-bar member between the first and second driver wheel assemblies, by the opposing seams, rotating the first and second driver wheel assemblies to move the C-bar.

H0. A method of twisting C-bar, comprising:

contacting a first side of opposing seams of a shell of the C-bar member with engaging portions of a first driver wheel assembly, contacting a second side of the opposing seams with engaging portions of a second driver wheel assembly, gripping the C-bar member between the first and second driver wheel assemblies, by the opposing seams, rotating the first driver wheel assembly at a first speed, rotating the second driver wheel assembly at a second speed, the second speed being different than the first speed.

J0. A method of reinforcing concrete, comprising:

pultruding a first reinforced material to form an inner core, forming a cladding layer comprising a resin material over said inner core, enclosing the inner core and the cladding layer with first and second shell portions to form a malleable outer shell, gripping opposing seams of the outer shell between a round static structure and a round rotatable structure, moving the rotatable structure around the static structure with a mechanical manipulation device controlled by a digital processing system, inducing one or more bends in the inner core, the cladding layer, and the outer shell, curing the inner core and the cladding layer, removing the outer shell to produce a bent rebar product, positioning the bent rebar product in a concrete mold, pouring concrete into the mold to cover the bent rebar product.

J1. The method of paragraph J0, further including storing the inner core, the cladding layer, and the outer shell for an extended period prior to the gripping step.

J2. The method of paragraph J1, further including heating the inner core, the cladding layer, and the outer shell subsequent to the storing step and prior to the gripping step.

J3. The method of any of paragraphs J0-J2, further including transporting the inner core, the cladding layer, and the outer shell to a work-site, and wherein the gripping, moving, inducing, and curing steps are performed after the transporting step.

K0. A rebar product, comprising:

a longitudinal axis, a plurality of reinforcing fibers extending along the longitudinal axis, and a cured thermoset resin material impregnating the reinforcing fibers, wherein the plurality of reinforcing fibers spirals circumferentially around the longitudinal axis.

L0. A rebar product, comprising:

a bar having a centerline between first and second bends, wherein the bar includes a plurality of reinforcing fibers impregnated with a cured resin, and a portion of the plurality reinforcing fibers between the first and second bends are under pre-tension.

M0. A method of producing rebar, comprising:

manufacturing a segment of rebar including an un-cured composite core clad in a shell having first and second flanges extending from opposite sides of the composite core, placing the segment into a bending apparatus, bending the segment to a desired form including applying a first roller to the first flange, and heating the segment sufficiently to cure the composite core of the rebar in the desired form.

M1. The method of paragraph M0, further comprising:

cooling the segment for an extended period of time between the pre-curing and placing steps.

M2. The method of paragraph M0 or M1, wherein the bending step includes applying a second roller to the second flange.

M3. The method of paragraph M2, wherein each of the first and second rollers are driven robotically.

M4. The method of paragraph M2 or M3, wherein the first and second rollers rotate around a common shaft.

M5. The method of any of paragraphs M2-M4, wherein the first and second rollers actively bend the segment around a curved structure.

M6. The method of paragraph M5, wherein the curved structure is passive.

M7. The method of any of paragraphs M0-M6, further comprising heating the segment to room temperature prior to the bending step.

M8. The method of any of paragraphs M0-M7, wherein the segment has a middle portion between first and second end portions, the bending step being carried out from the middle portion to the first and second end portions simultaneously.

M9. The method of any of paragraphs M0-M8, wherein the bending apparatus includes a base having a planar surface and a plurality of curved structures, the method further comprising:

selectively mounting the plurality of curved structures at different locations on the planar surface, for bending the segment to the desired form.

Advantages, Features, and Benefits

The different embodiments and examples of the C-bar bending systems and methods described herein provide numerous advantages over known reinforcing bar bending techniques. For example, illustrative embodiments and examples described herein allow hermetic sealing of C-bars for cold storage and ease of handling and transport.

Additionally, and among other benefits, illustrative embodiments and examples described herein allow for automated bending of C-bar without compromising the fiber-resin constitution of the core.

Additionally, and among other benefits, illustrative embodiments and examples described herein allow for retention of bend geometry in C-bar after curing.

Additionally, the examples described herein allow conductive heat transfer through the C-bar via the aluminum sheath.

Additionally, the examples described herein allow for gripping of the C-bar without causing damage to the C-bar core when transporting along a neutral axis defined by the flanges during bending/twisting of the C-bar.

Additionally, the examples described herein allow for temporary labeling, e.g., with manufacture date and lot number on the removable sheath of the C-bar.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. It is noted that various combinations and subcombinations of components have been described. Any of the components described or shown may be combined with any other components described or shown to create additional embodiments. In addition, explicit reference is hereby made to all inventions shown in the drawings. To the extent that section headings are used within this disclosure, such headings are for organizational purposes only. The subject matter of the disclosure includes all novel and nonobvious combinations and subcombinations of the various elements, features, functions, and/or properties disclosed herein.

What is claimed is:

1. An automated composite rebar (C-bar) bending system, comprising:
   one or more non-rotatable and stationary supports, each having a circumferential side surface with separate upper and lower engaging portions,
   a freely rotatable and movable support, having a circumferential side surface with separate upper and lower engaging portions,
   a mechanical manipulation device connected to the movable support and configured to move the movable support relative to the one or more stationary supports, and
   a controller directing movement of the mechanical manipulation device,
   wherein each of the one or more stationary supports and the movable support are configured to grip an upper flange of a C-bar between the upper engaging portion of the movable support and the respective stationary support and a lower flange of the C-bar between the lower engaging portion of the movable support and the respective stationary support, such that a cylindrical body of the C-bar is not contacted by the supports.

2. The system of claim 1, wherein the one or more stationary supports comprise a plurality of non-rotatable and stationary supports.

3. The system of claim 2, wherein the upper and lower engaging portions of the movable support are upper and lower rollers, which rotate around a common shaft.

4. The system of claim 2, further including a platform on which the plurality of stationary supports are secured in a pattern corresponding to a desired bend geometry.

5. The system of claim 4, wherein the platform and the plurality of stationary supports are reconfigurable between multiple patterns.

6. The system of claim 2, wherein the controller is a digital processing system including a memory having stored instructions for movement of the movable support corresponding to a pattern of the plurality of stationary supports and a desired bend geometry.

7. The system of claim 1, wherein the system is portable.

8. The system of claim 1, wherein the movable support includes a brake actuated by the controller.

9. The system of claim 1, further including an inductive heating system configured to cure a composite core of the C-bar by heating a metal shell of the C-bar.

10. The system of claim 1, wherein the upper and lower engaging portions of the respective stationary support are spaced from the upper and lower engaging portions of the movable support when the supports grip the flanges of a C-bar.

11. The system of claim 1, wherein the movable and stationary supports each include a recess between the upper and lower engaging portions, configured to receive a C-bar without contact.

12. An automated composite rebar (C-bar) bending system, comprising:
    a stationary support, having separate upper and lower engaging portions,
    a movable support, having separate upper and lower engaging portions,
    a mechanical manipulation device connected to the movable support and configured to move the movable support relative to the stationary support,
    a controller directing movement of the mechanical manipulation device, and
    a C-bar having a composite core surrounded by a shell, the shell including upper and lower flanges extending from opposite sides of the composite core,
    wherein the C-bar is received between the stationary and movable supports with the upper flange gripped between the upper engaging portions and the lower flange gripped between the lower engaging portions, such that the stationary and movable supports contact only the flanges of the C-bar.

13. The system of claim 12, wherein the core and a cylindrical body of the shell of the C-bar are disposed below the upper engaging portions of the supports, and above the lower engaging portions of the supports.

14. The system of claim 12, wherein the upper and lower engaging portions of the movable support are upper and lower rollers, which freely rotate around a common shaft.

15. The system of claim 14, wherein the upper and lower engaging portions of the stationary support are upper and lower disc-shaped structures, which are connected by a central shaft.

16. The system of claim 15, wherein the upper roller of the movable support is spaced from the upper disc-shaped structure of the stationary support by the upper flange of the C-bar.

* * * * *